June 18, 1935.  E. M. POST, JR  2,005,558

APPARATUS FOR HYDRATING AIR IN REFRIGERATING MECHANISMS

Filed Nov. 15, 1932  2 Sheets-Sheet 1

INVENTOR
Edwin M. Post, Jr.,
BY
Redding, Greeley, O'Shea & Campbell
HIS ATTORNEYS June 18, 1935.  E. M. POST, JR  2,005,558
APPARATUS FOR HYDRATING AIR IN REFRIGERATING MECHANISMS
Filed Nov. 15, 1932  2 Sheets-Sheet 2

INVENTOR
Edwin M. Post, Jr.,
BY
Redding, Greeley, O'Shea & Campbell
HIS ATTORNEYS Patented June 18, 1935

2,005,558

UNITED STATES PATENT OFFICE 2,005,558

APPARATUS FOR HYDRATING AIR IN REFRIGERATING MECHANISMS

Edwin M. Post, Jr., New York, N. Y., assignor to International Motor Company, New York, N. Y., a corporation of Delaware Application November 15, 1932, Serial No. 642,724

4 Claims. (Cl. 62—140)

The present invention relates to refrigerating mechanisms and embodies, more specifically, a humidifying device by means of which the humidity within a refrigerating chamber may be maintained at a substantially constant value. Where a refrigerating apparatus is utilized wherein the temperature of the refrigerating element is below freezing, the tendency of the element to freeze the moisture in the air which is circulated about the element is well known and as a result the air within the refrigerating compartment is dehumidified. This condition frequently becomes highly objectionable in as much as substances which contain moisture and are placed within the refrigerating chamber are rapidly dried and frequently rendered unfit for use.

In accordance with the present invention, it is proposed to provide a means for returning the moisture which is removed from the circulating air by the refrigerating element to the refrigerating chamber. This is accomplished by removing the frost from the refrigerating element, melting the same, and vaporizing the resulting liquid in the refrigerating chamber.

An object of the invention, accordingly, is to provide a device for maintaining a predetermined humidity in a refrigerating chamber.

A further object of the invention is to provide a refrigerating mechanism wherein means is provided for supplying a desired quantity of moisture to the air within the refrigerating chamber.

A further object of the invention is to provide a refrigerating device wherein the frozen moisture about the refrigerating element is melted and vaporized within the refrigerating chamber.

A further object of the invention is to provide means for removing the frozen moisture from a refrigerating element of a refrigerating device, melting such frozen particles and atomizing and circulating the melted particles within the refrigerating compartment.

Further objects, not specifically enumerated above, will be apparent as the invention is described in greater detail in connection with the accompanying drawings, wherein.

Figure 1:
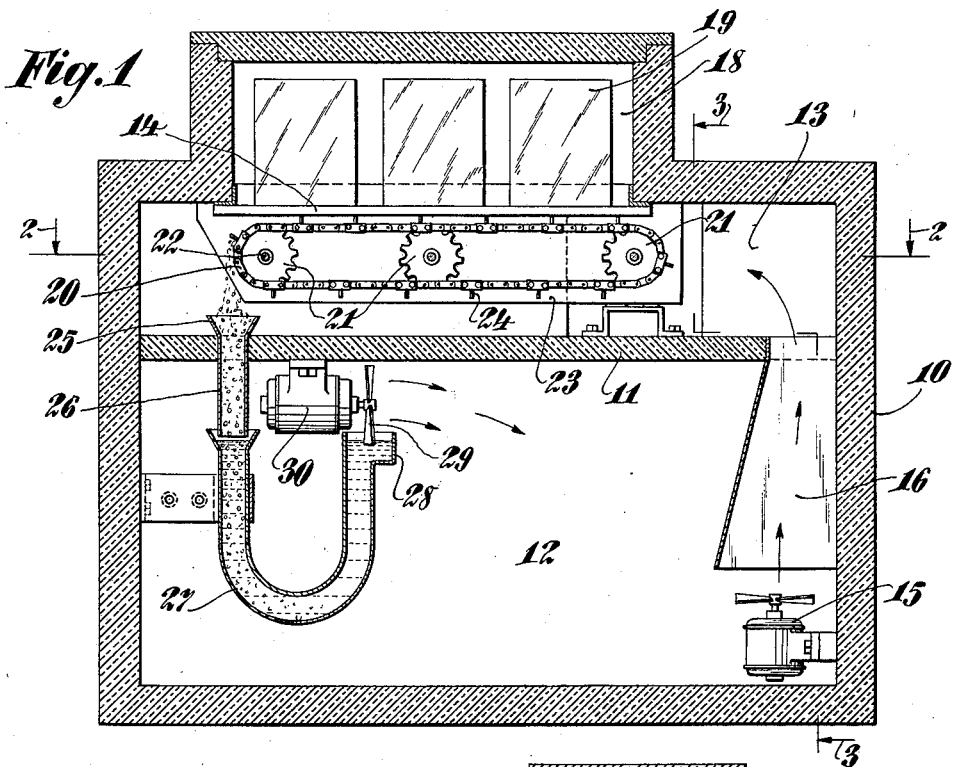
Figure 1 is a view in section, taken through a refrigerating device constructed in accordance with the present invention, taken on the line 1—1 of Figure 2, and looking in the direction of the arrows.

With reference to the above drawings, a container 10 is formed of suitable insulating material and provided with a partition 11 which forms a refrigerating chamber 12 and a circulating chamber 13. The circulating chamber is provide with suitable baffles to facilitate the flow of air about a cold element 14 which may form a portion of a wall of the circulating chamber.

Figure 2:
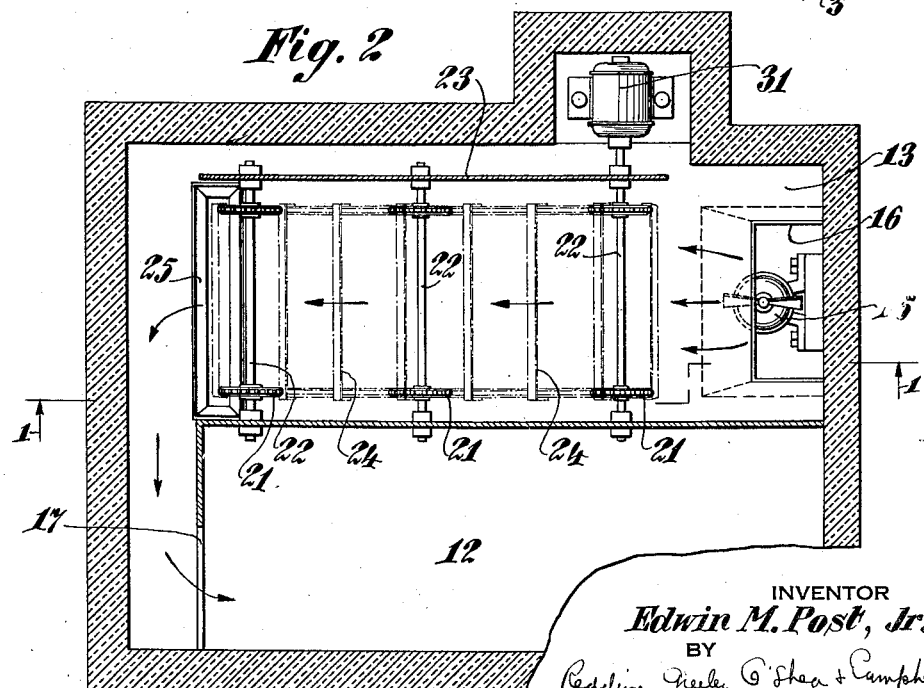
Figure 2 is a view in section, taken on line 2—2 of Figure 1, and looking in the direction of the arrows.
Figure 3:
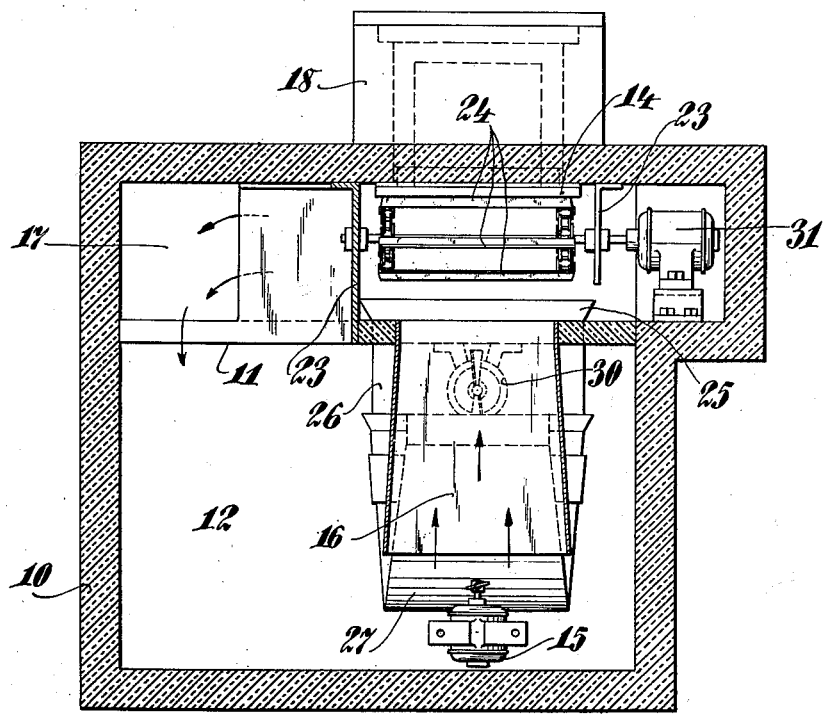
Figure 3 is a view in section, taken on the broken line 3—3 of Figure 1, and looking in the direction of the arrows.

A predetermined flow of air through the circulating chamber is maintained by means of a fan 15 which directs air from the refrigerating chamber 12 through a funnel 16 in the manner indicated by the arrows of Figure 1 and this air is directed over the cold element 14. After flowing over the cold element 14 and having some of the heat thereof removed the air is directed back into the refrigerating chamber through an aperture 17 as indicated by the arrows in Figure 2.

The cold element 14 may be formed in any desired shape preferably in such shape as to facilitate the scraping of frost therefrom by means of a scraping mechanism described hereinafter. The cold element may furthermore include a portion of one wall of an auxiliary chamber 18 within which blocks of a refrigerant 19 may be placed in order that the refrigerant may rest, or be urged against the element 14. Solid carbon dioxide is one form of refrigerant which may be utilized and which has proved to be highly successful.

If the temperature of the cold element 14 is below a predetermined value, it will solidify the moisture content of the air circulating about it and cause the same to be coated with frozen particles of frost or snow. As noted above, this causes a powerful dehumidifying effect and in many cases is quite objectionable where certain food stuff is placed within the refrigerating chamber. In order that this moisture may be removed from a cold element and reintroduced into the atmosphere of the refrigerating chamber, a scraping device is provided in the form of an endless belt 20 which may be formed of spaced endless loops of a link chain engaging driving and idle sprockets 21. Sprockets 21 may be mounted upon shafts 22, these shafts being journaled within a supporting member 23 below the cold element 14. Between the chain loops 20 transverse scraper blades 24 are mounted, the chains being supported in such fashion that the scraper blades engage the lower surface of the cold element 14 and scrape the frost and snow therefrom. The frost and snow falls into a funnel 25 and is directed into a melting chamber 26 within the refrigerating compartment. From the melting chamber, the moisture drops into a U-tube 27 formed with a pan 28. Above the pan 28, a fan or other device 29 is mounted, motor 30 being provided to drive the same. The fan blades, in their rotation, move within the upper portion of the fan 28 and, when the liquid level therein rises to a sufficient height, atomizes and circulates the same through the refrigerating compartment as indicated by the arrows adjacent the fan 29.

It will thus be seen that not only is the atmosphere within the refrigerating chamber maintained at a desired humidity but the constant defrosting of the cold element 14 enables the refrigerating apparatus to function more effectively. Any suitable means may be provided for driving the scrapers 24 and chains 20, in the construction shown, this being accomplished by means of a motor 31 which drives the right hand shaft 22, as viewed in Figure 2.

While the invention has been described with specific reference to the accompanying drawings, it is not to be limited, save as defined in the appended claims.

I claim as my invention:

1. A refrigerating device comprising a refrigerating chamber, a refrigerating element associated therewith, a scraping mechanism to remove frost from the refrigerating element, means associated with the chamber to melt the frosting, and air circulating means in the chamber to vaporize the resulting liquid in the refrigerating air.

2. A refrigerating device comprising a refrigerating chamber, a refrigerating element associated therewith, a scraping mechanism to remove frost from the refrigerating element, means to melt the frosting, a receptacle in the chamber for the resulting liquid, and a fan associated with the receptacle to direct air thereover.

3. A refrigerating device comprising a refrigerating chamber, a refrigerating element associated therewith, a scraping mechanism to remove frost from the refrigerating element, a receptacle in the chamber to receive and melt the removed frost, a U-tube to receive liquid from the receptacle, and a fan associated with the U-tube to vaporize the liquid and circulate the same in the chamber.

4. A refrigerating device comprising a refrigerating chamber, a refrigerating element associated therewith, a scraping mechanism to remove frost from the refrigerating element, a receptacle in the chamber to receive and melt the removed frost, a U-tube to receive liquid from the receptacle, and a fan associated with the U-tube to vaporize the liquid and circulate the same in the chamber, said fan being mounted to cause the rotating blades thereof to dip into liquid within the U-tube when the level thereof attains a predetermined height.

EDWIN M. POST, JR.